United States Patent
Lin et al.

(10) Patent No.: US 12,315,926 B2
(45) Date of Patent: May 27, 2025

(54) PREPARATION METHOD AND APPLICATION OF MULTIFUNCTIONAL INTERFACE LAYER MODIFIED COMPOSITE ZINC CATHODE BASED ON ZINC BLENDE

(71) Applicant: CENTRAL SOUTH UNIVERSITY, Changsha (CN)

(72) Inventors: Shangyong Lin, Changsha (CN); Shuang Zhou, Changsha (CN)

(73) Assignee: CENTRAL SOUTH UNIVERSITY (CN)

( * ) Notice: Subject to any disclaimer, the term of this patent is extended or adjusted under 35 U.S.C. 154(b) by 0 days.

(21) Appl. No.: 18/735,247

(22) Filed: Jun. 6, 2024

(65) Prior Publication Data
US 2025/0140850 A1   May 1, 2025

(30) Foreign Application Priority Data
Oct. 27, 2023   (CN) .......................... 202311408702.9

(51) Int. Cl.
| | |
|---|---|
| H01M 4/58 | (2010.01) |
| H01M 4/04 | (2006.01) |
| H01M 4/1397 | (2010.01) |
| H01M 4/62 | (2006.01) |
| H01M 10/36 | (2010.01) |
| H01M 4/02 | (2006.01) |

(52) U.S. Cl.
CPC ........... *H01M 4/5815* (2013.01); *H01M 4/04* (2013.01); *H01M 4/0404* (2013.01); *H01M 4/1397* (2013.01); *H01M 4/623* (2013.01); *H01M 10/36* (2013.01); *H01M 2004/028* (2013.01)

(58) Field of Classification Search
CPC .... H01M 4/04; H01M 4/5815; H01M 4/0404; H01M 4/1397; H01M 4/623; H01M 10/36; H01M 2004/028
See application file for complete search history.

(56) References Cited

U.S. PATENT DOCUMENTS

| | | | |
|---|---|---|---|
| 2011/0104570 A1* | 5/2011 | Galloway | H01M 4/136 429/221 |
| 2020/0176774 A1* | 6/2020 | Kamiguchi | H01M 10/054 |

FOREIGN PATENT DOCUMENTS

CN   114899505 A   8/2022

OTHER PUBLICATIONS

EPO machine generated English translation of CN 114899505 A (Year: 2022).*

* cited by examiner

*Primary Examiner* — Sean P Cullen
*Assistant Examiner* — Kimberly Wyluda (57) ABSTRACT

The invention relates to a method and application of a multifunctional interface layer modified composite zinc cathode based on zinc blende in zinc metal batteries. Zinc blende powder is produced by crushing and ball milling, then mixed with a solvent and wet screened. The fine zinc blende is dried and mixed with a surfactant to obtain grafted fine powder. This modified powder is combined with a binder and organic solvent to form a slurry, which is coated on the zinc metal cathode. After drying, the modified composite zinc metal cathode is applied to aqueous zinc metal batteries. This method stabilizes the zinc cathode, isolates electrolyte corrosion, inhibits zinc dendrite growth, and addresses issues of dendrite formation, hydrogen evolution, and corrosion, thereby extending the battery's service life.

16 Claims, 9 Drawing Sheets

PREPARATION METHOD AND APPLICATION OF MULTIFUNCTIONAL INTERFACE LAYER MODIFIED COMPOSITE ZINC CATHODE BASED ON ZINC BLENDE

TECHNICAL FIELD

The invention relates to the technical field of zinc metal battery, and specifically relates to a preparation method and application of multifunctional interface layer modified composite zinc cathode based on zinc blende.

BACKGROUND ART

Electrochemical energy storage technology, namely battery, has attracted more and more attention because of its advantages of convenient use, less environmental pollution and high conversion efficiency. At present, lithium-ion battery occupies a dominant position in the energy storage market, but the organic electrolyte system used in the lithium-ion battery has potential safety hazards such as toxicity and flammability, and the low abundance and high cost of metal lithium resources seriously hinder its large-scale application. In response to this problem, researchers have proposed to replace organic electrolytes with safer aqueous electrolytes to develop new aqueous metal ion battery. Among many metals, zinc metal has the advantages of low price, abundant reserves, low oxidation-reduction potential (−0.763 Vvs.SHE), high theoretical capacity (820 mAh/g), and high volume specific capacity (5855 mAh/cm3). When matching aqueous electrolyte, it also has the advantages of high ionic conductivity, high safety, easy assembly and non-toxicity, it is considered to be one of the most promising candidates in the field of large-scale energy storage. However, the thermodynamic stability of zinc cathode in aqueous electrolyte is poor, which leads to a series of interface problems, such as irregular dendrite growth, uncontrolled hydrogen evolution reaction, severe corrosion and passivation, resulting in battery capacity attenuation or even bulging and short circuit.

In order to improve the thermodynamic stability of zinc metal cathode, optimize the interface between zinc metal cathode and aqueous electrolyte, and reduce the problems of dendrite, corrosion and hydrogen evolution at the interface, the following methods are proposed: (1) design of structured cathode; (2) construction of functional interface layer; (3) electrolyte modification (high concentration electrolyte, electrolyte additive); (4) design of functional diaphragm. Among them, construction of artificial interface layer and electrolyte additive are considered to be two very effective and simple interface modification strategies. The former can not only isolate the direct contact between electrolyte and zinc cathode, but also homogenize the interface zinc ion flow; the electrolyte modification is to achieve the purpose of inhibiting dendrite and reducing corrosion by adjusting the zinc ion transport behavior at the interface and optimizing the zinc ion solvation structure. The combination of the two methods is considered to be a strategy to improve the zinc metal cathode in an all-round way.

In aqueous zinc metal battery, the artificial interface layer on the surface of zinc metal cathode should meet the requirements of simple preparation process, high hydrogen evolution energy barrier and strong zinc affinity. Electrolyte additive should have the characteristics of strong zinc affinity and adjustable hydrated zinc ion structure. Different from the traditional zinc sulfide (ZnS) preparation process, it is complex and environmentally unfriendly. Zinc blende is considered to be a low-cost, simple and environmentally friendly ZnS interface layer filler, which can prolong the cycle life of zinc metal cathode to a certain extent. It is worth noting that this artificial interface layer based on zinc blende still has a lot of room for improvement in stabilizing zinc metal and prolonging its life. Therefore, it is an urgent problem to develop a zinc blende multifunctional interface layer with simple process and zinc ion solvation structure adjustment function, so as to prolong the service life of aqueous zinc metal battery. In view of the above problems, the invention provides a preparation method and application of multifunctional interface layer modified composite zinc cathode based on zinc blende.

SUMMARY

The purpose of the invention is to provide a preparation method and application of multifunctional interface layer modified composite zinc cathode based on zinc blende. A low-cost, simple and environmentally friendly multifunctional artificial interface layer is prepared to stabilize the zinc metal cathode, isolate electrolyte corrosion, inhibit zinc dendrite growth, solve the problems of dendrite, hydrogen evolution and corrosion of zinc metal cathode in aqueous zinc metal battery, and then prolong the service life of aqueous zinc metal battery.

In order to achieve the above purpose, the invention provides a preparation method of multifunctional interface layer modified composite zinc cathode based on zinc blende, comprising the following steps:

S1, conducting ball milling on zinc blende after crushing it to obtain the zinc blende powder;

S2, mixing the zinc blende powder with the solvent, conducting wet screening through a sieve, collecting and drying it to obtain fine zinc blende powder;

S3, adding the above fine zinc blende powder into a certain concentration of zwitterionic surfactant solution and stirring it for a period of time, after suction filtration and drying, the grafted modified fine zinc blende powder is obtained;

S4, mixing the above-mentioned graft modified fine zinc blende powder with the binder in a certain proportion, and then adding an organic solvent into it to make a slurry;

S5, uniformly coating the above slurry on the surface of the zinc metal cathode, and then conducting drying treatment to obtain the multifunctional interface layer modified composite zinc cathode.

Preferably, the ball milling in S1 comprises ordinary ball milling and high-performance planetary ball milling, in which the speed of ordinary ball milling is 100-300 r/min, and the ball milling time is 1-6 h; the rotation speed of high-performance planetary ball milling is 800-1200 r/min, and the ball milling time is 6-14 h.

Preferably, the solvent used in S2 is anhydrous ethanol or water, the mesh of the sieve used is 1800-2800 mesh, the drying device is a vacuum drying box or a ventilated drying box, the drying temperature is 40-100° C., and the drying time is 6-24 h.

Preferably, the zwitterionic surfactant used in S3 is amino acid surfactant or betaine surfactant, the concentration of the zwitterionic surfactant is ≥0.1 mol/L, the stirring time is >2 h, and the drying temperature is 40-100° C.

Preferably, the amino acid surfactant is dodecyl aminopropionic acid or sodium dodecyl aminopropionic acid, and the betaine surfactant is 2-(methacryloyloxy) ethyl dimethyl-(3-sulfopropyl) ammonium hydroxide or alkyl dimethyl hydroxypropyl phosphate betaine.

Preferably, the binder used in S4 is polyvinylidene fluoride, and the organic solvent used is N-methyl-2-pyrrolidone; the mass ratio of graft modified fine zinc blende powder to binder is 9.5:0.5, 9:1, 8:2 or 8.5:1.5.

Preferably, the coating method in S5 is one of scraping coating, spin coating or drop coating; the drying device is a vacuum drying oven or a ventilated drying oven, the drying temperature is 40-100° C. and the drying time is 6-24 h.

The composite zinc cathode prepared by the above preparation method of multifunctional interface layer modified composite zinc cathode based on zinc blende.

The application of the above composite zinc cathode in aqueous zinc metal battery.

The thickness of the multifunctional interface layer on the surface of the composite zinc cathode is 10-50 μm.

The raw material used in the invention is zinc blende with zinc affinity and high hydrogen evolution energy barrier, after crushing, ball milling, screening and electrolyte grafting, uniform and fine graft modified zinc blende powder can be obtained, which is coated on the surface of zinc metal cathode, the multifunctional artificial interface layer can play the role of artificial interface layer and electrolyte additive at the same time. On the one hand, it can isolate the direct contact between the electrolyte and the zinc cathode and homogenize the interface zinc ion flow, on the other hand, the zwitterionic surfactant adsorbed on the surface of the ore can achieve the purpose of inhibiting dendrite and reducing corrosion by adjusting the zinc ion transport behavior at the interface or optimizing the zinc ion solvation structure. This process is simple and has the function of adjusting the solvation structure of zinc ions, it is used to coat the zinc metal cathode, which can prolong the service Therefore, the invention provides a preparation method and application of multifunctional interface layer modified composite zinc cathode based on zinc blende, the beneficial effects are as follows:

(1) The multifunctional interface layer of natural zinc blende is coated on the surface of the zinc cathode, after the battery is charged and discharged, zinc can be uniformly electroplated and peeled off under the coating, which avoids the short circuit of the battery caused by piercing the diaphragm, and improves the coulomb efficiency and cycle performance. The multifunctional interface layer also has the function of interface protection layer and electrolyte additive, which prolongs the service life of the battery. The zinc metal battery assembled with the zinc metal cathode modified by the multifunctional interface layer can prolong the cycle life by much more than 100 times under the condition of current density of 0.25 mA/cm2 and surface capacity of 0.25 mAh/cm2;

(2) The natural zinc blende coated by the invention has excellent zinc affinity and provides a lot of nucleation sites, thereby guiding uniform new metal deposition behavior, inhibiting dendrite growth, and inhibiting side reactions between metal zinc and electrolyte (3) The zwitterionic surfactant adsorbed on the mineral surface can inhibit dendrite and reduce corrosion by adjusting the transport behavior of zinc ions at the interface or optimizing the solvation structure of zinc ions;

(4) The raw materials used in the preparation process of the invention have a wide range of sources, the process is simple and environmentally friendly.

The following is a further detailed description of the technical scheme of the invention through drawings and embodiments.

DETAILED DESCRIPTION OF THE EMBODIMENTS

The following detailed description of the embodiment of the invention provided in the drawings is not intended to limit the protection scope of the invention, but merely indicates the selected embodiments of the invention. Based on the embodiments in the invention, all other embodiments obtained by ordinary technicians in this field without making creative labor belong to the protection scope of the invention.

Embodiment 1

The invention provides a preparation method of multifunctional interface layer modified composite zinc cathode based on zinc blende, which comprises the following steps:

S1, after crushing the zinc blende, the ordinary ball mill is used to grind at a speed of 200 r/min for 2 h, and then the high-performance planetary ball mill is used to grind at a speed of 1200 r/min for 8 h to obtain the zinc blende powder;

S2, after mixing the zinc blende powder with anhydrous ethanol, the sieve with a mesh of 2400 is used for wet screening and placed in a ventilated drying oven, after drying a 60° C. for 8 h, the uniform fine zinc blende powder is obtained;

S3, the above zinc blende powder is added to 0.2 mol/L 2-(methacryloyloxy) ethyl dimethyl-(3-sulfopropyl) ammonium hydroxide (DMAPS) solution and then it is stirred it for 30 min, after suction filtration and overnight drying, the grafted fine zinc blende powder (Sph2400) is obtained;

S4, the above graft modified fine zinc blende powder is mixed with polyvinylidene fluoride (PVDF) at a mass ratio of 9:1, and then N-methyl-2-pyrrolidone (NMP) is added to make a slurry;

S5, the slurry is uniformly scraped on the surface of the zinc metal cathode and then it is placed in a vacuum drying oven at 60° C. vacuum condition for 8 h, finally a multifunctional interface layer modified composite zinc metal cathode (Sph2400-DM@Zn) is obtained.

Figure 1:
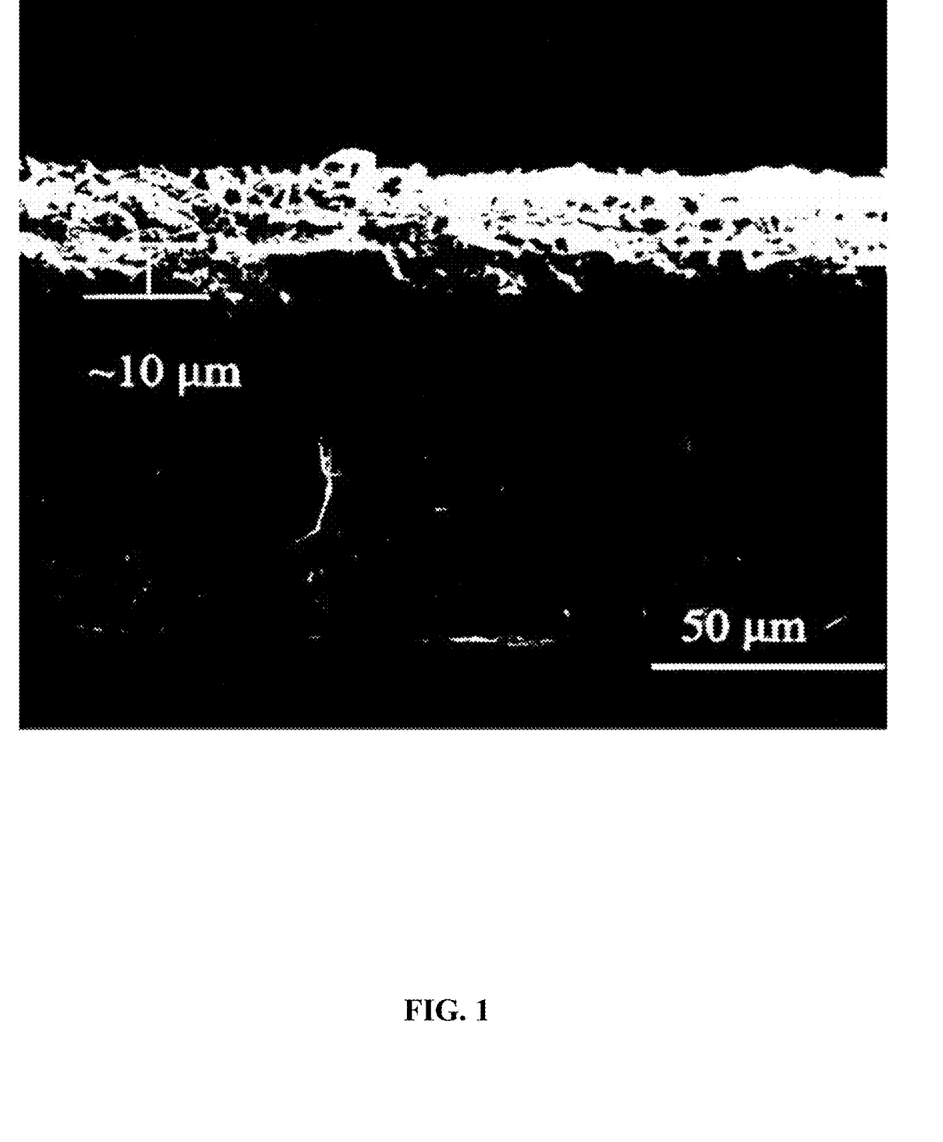
FIG. 1 is the cross-section scanning diagram of the composite zinc metal cathode containing the multifunctional interface layer of natural zinc blende prepared in Embodiment 1 of the invention.

As shown in FIG. 1, it can be observed that the interface layer is tightly covered on the zinc metal surface with a thickness of about 10 μm.

Embodiment 2

Figure 2:
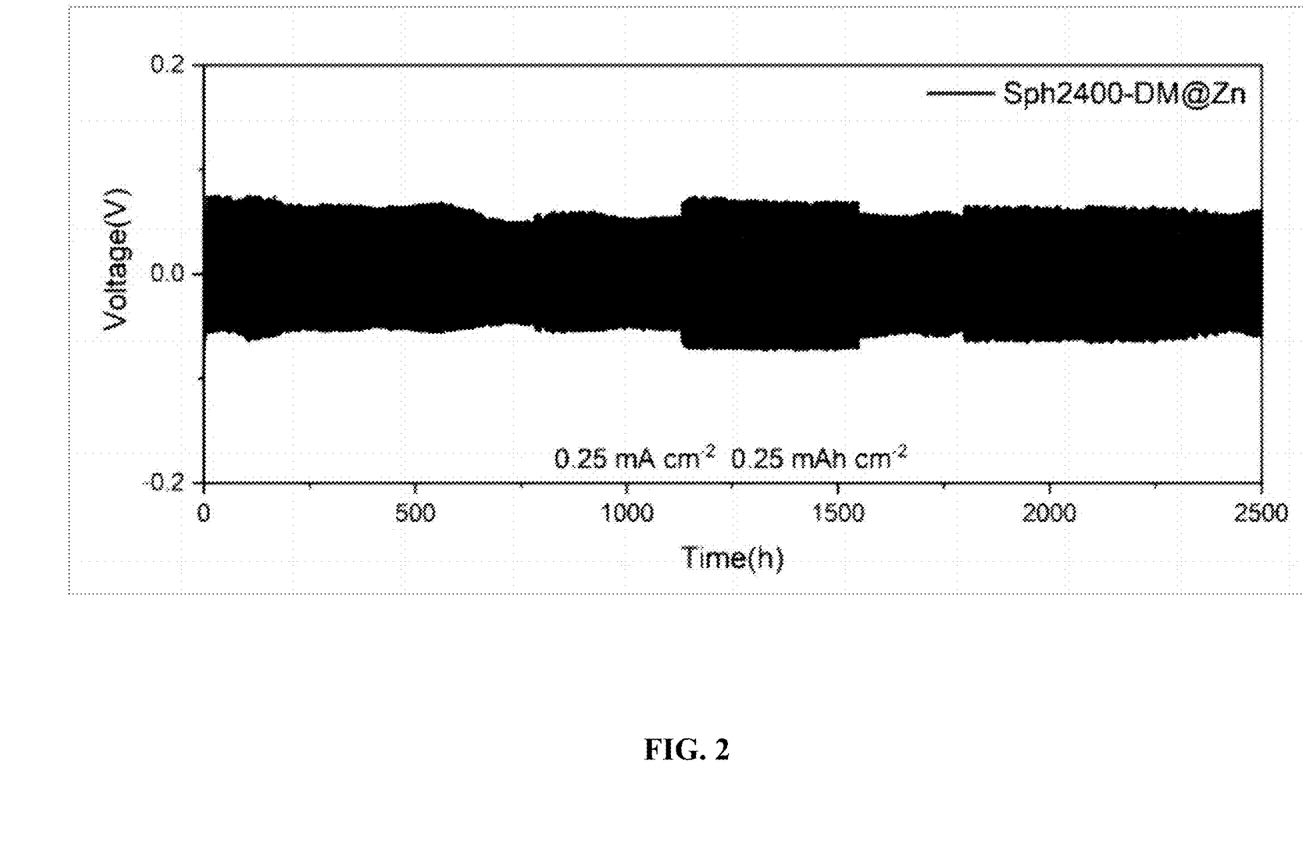
FIG. 2 is the cycle performance diagram of the symmetrical battery composed of composite zinc metal cathode (Sph2400-DM@Zn) containing natural zinc blende multifunctional interface layer in Embodiment 2 of the invention at a current density of 0.25 mA/cm2 and a surface capacity of 0.25 mAh/cm2.

The application of multifunctional interface layer modified zinc metal cathode in aqueous zinc metal battery, the specific steps comprise: the Sph2400-DMQZn electrode prepared in Embodiment 1 is assembled into a symmetrical battery, the electrolyte is 2 mol/L ZnSO4 solution, the assembled Sph2400-DM@Zn//Sph2400-DM@Zn symmetrical battery performs a long cycle at a current density of 0.25 mA/cm2 and a surface capacity of 0.25 mAh/cm2, the performance is shown in FIG. 2.

Figure 3:
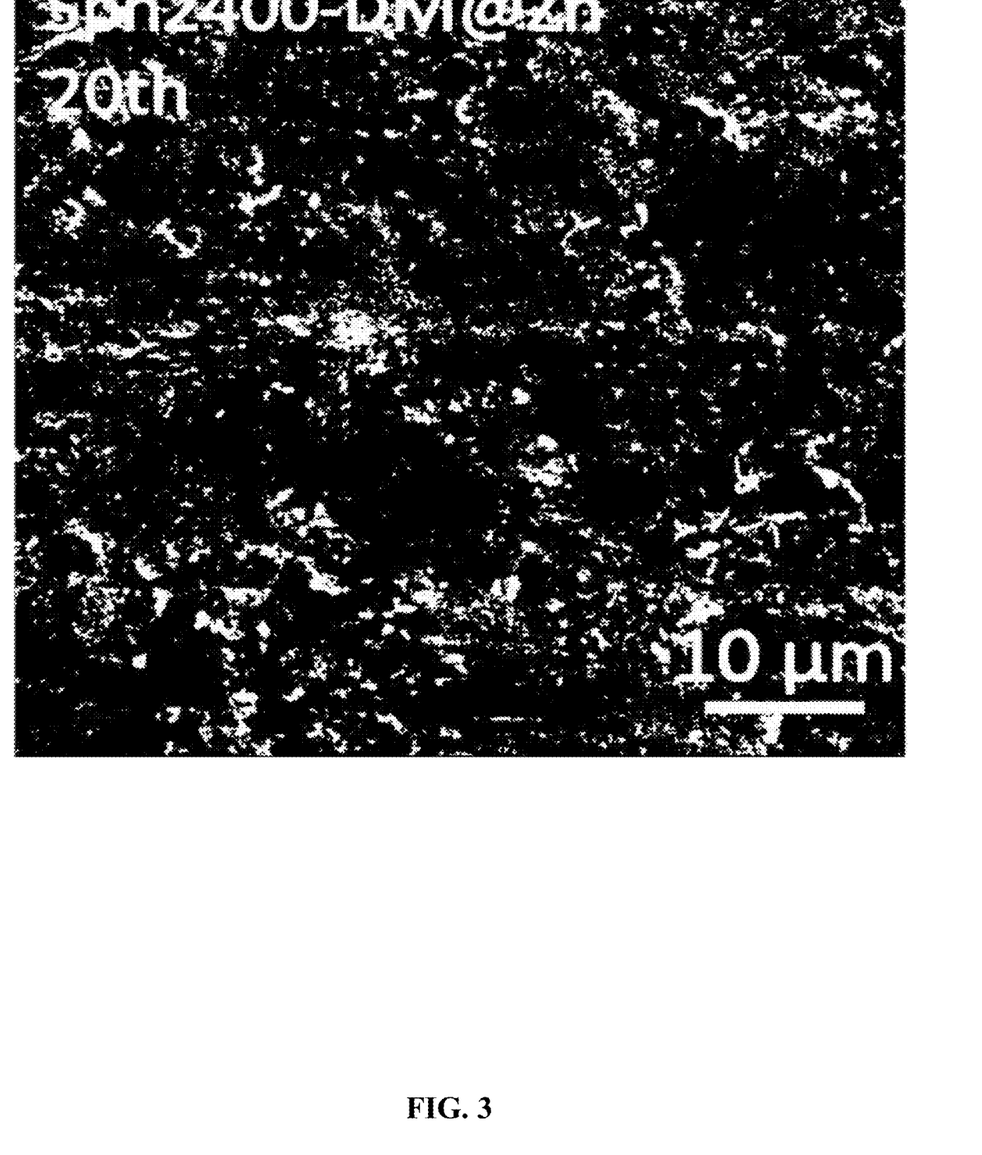
FIG. 3 is the scanning diagram of the zinc cathode surface after removing the coating after 20 cycles (40 hours) of the symmetrical battery composed of composite zinc metal cathode (Sph2400-DM@Zn) containing natural zinc blende multifunctional interface layer in Embodiment 2 of the invention at a current density of 0.25 mA/cm2 and a surface capacity of 0.25 mAh/cm2.

Assembled Sph2400-DM@Zn//Sph2400-DM@Zn symmetrical battery is cycled at a current density of 0.25 mA/cm2 and a surface capacity of 0.25 mAh/cm2, after 20 cycles (corresponding to 40 hours), the battery is disassembled, and then the surface interface layer is removed, the surface photo of the zinc metal cathode is shown in FIG. 3.

Embodiment 3

Figure 8:
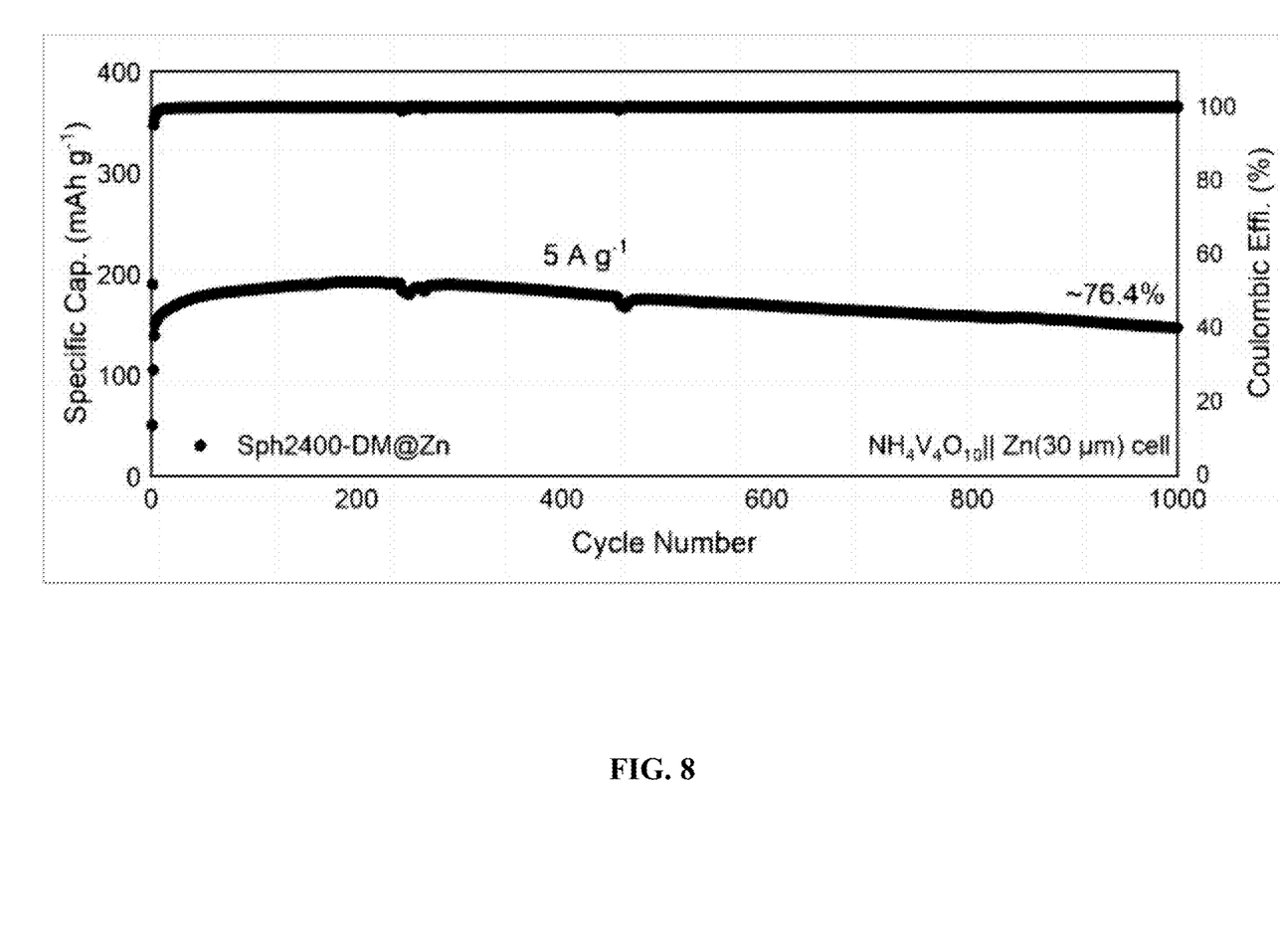
FIG. 8 is the cycle performance diagram of the zinc ion battery composed of composite zinc metal cathode (Sph2400-DM@Zn, 30 μm) containing natural zinc blende multifunctional interface layer and anode of ammonium vanadate (NH4V4O10) in Embodiment 3 of the invention under 5 A g-1 test condition.

The Sph2400-DM@Zn composite zinc cathode (30 μm) in Embodiment 1 is used to match the ammonium vanadate anode (NH4V4O10), and the electrolyte is 2 mol/L ZnSO4 solution, the assembled Sph2400-DMQZn//NH4V4O10 zinc ion battery is conducting the long cycle test under the 5 A g-1 test condition, the test results are shown in FIG. 8.

Ratio 1

S1, after crushing the zinc blende, the ordinary ball mill is used to grind at a speed of 200 r/min for 2 h, and then the high-performance planetary ball mill is used to grind at a speed of 1200 r/min for 8 h to obtain the zinc blende powder;

S2, after mixing the zinc blende powder with anhydrous ethanol, the sieve with a mesh of 2400 is used for wet screening and then it is placed in a ventilated drying oven, after drying at 60° C. for 8 h, the uniform fine zinc blende powder is obtained;

S3, the above graft modified fine zinc blende powder is mixed with polyvinylidene fluoride (PVDF) at a mass ratio of 9:1, and then N-methyl-2-pyrrolidone (NMP) is added to make a slurry;

S4, the slurry is uniformly scraped on the surface of the zinc metal cathode and then it is placed in a vacuum drying oven at 60° C. vacuum condition for 8 h, finally a multifunctional interface layer modified composite zinc metal cathode (Sph2400-DM@Zn) is obtained.

Ratio 2

Figure 4:
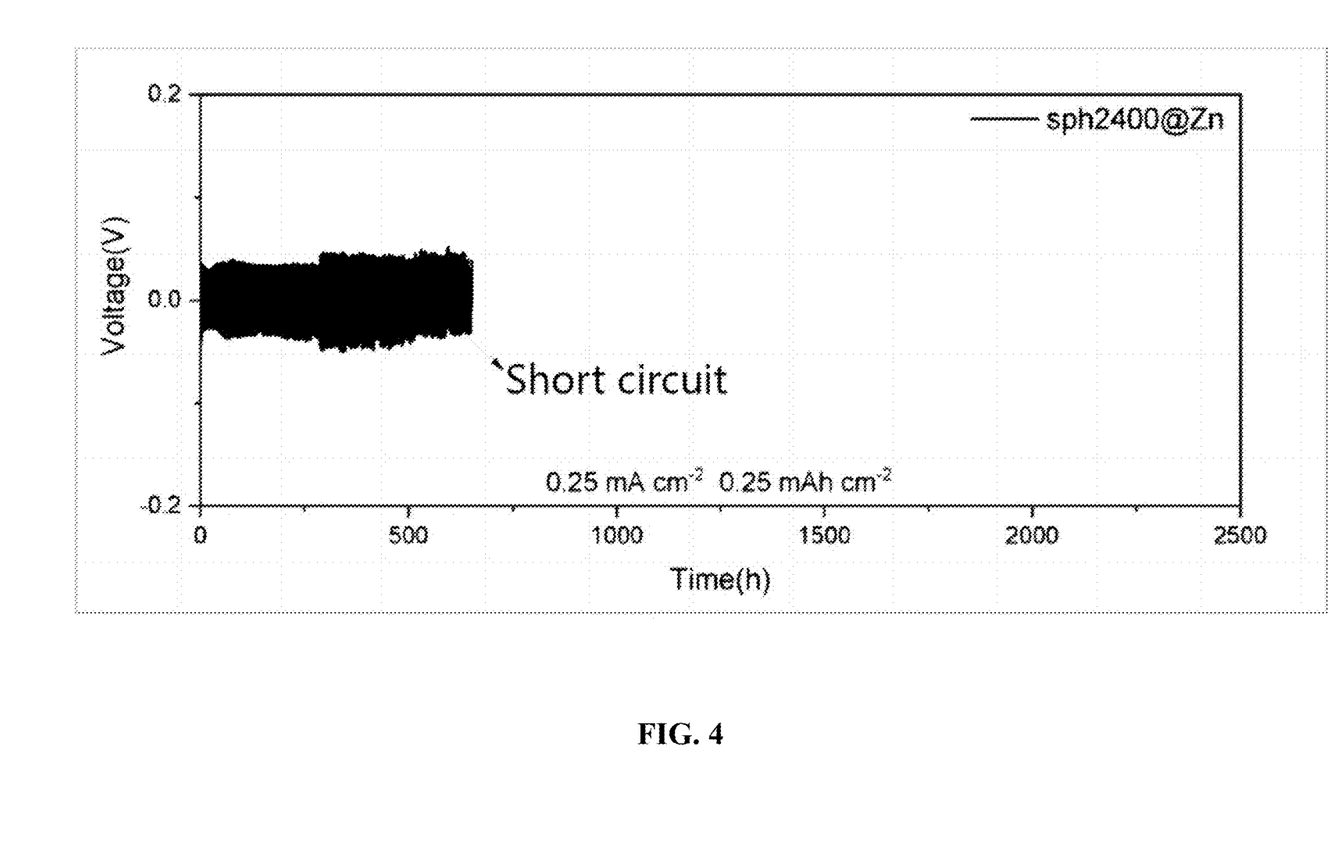
FIG. 4 is the cycle performance diagram of the symmetrical battery composed of zinc metal cathode (Sph2400@Zn) containing natural zinc blende multifunctional interface layer in Ratio 2 of the invention under the condition of current density of 0.25 mA/cm2 and surface capacity of 0.25 mAh/cm2.

The application of multifunctional interface layer modified zinc metal cathode in aqueous zinc metal battery, the specific steps comprise: the Sph2400-DMQZn electrode prepared in Embodiment 1 is assembled into a symmetrical battery, the electrolyte is 2 mol/L ZnSO4 solution, the assembled Sph2400-DM@Zn//Sph2400-DM@Zn symmetrical battery performs a long cycle at a current density of 0.25 mA/cm2 and a surface capacity of 0.25 mAh/cm2, the performance is shown in FIG. 4.

Figure 5:
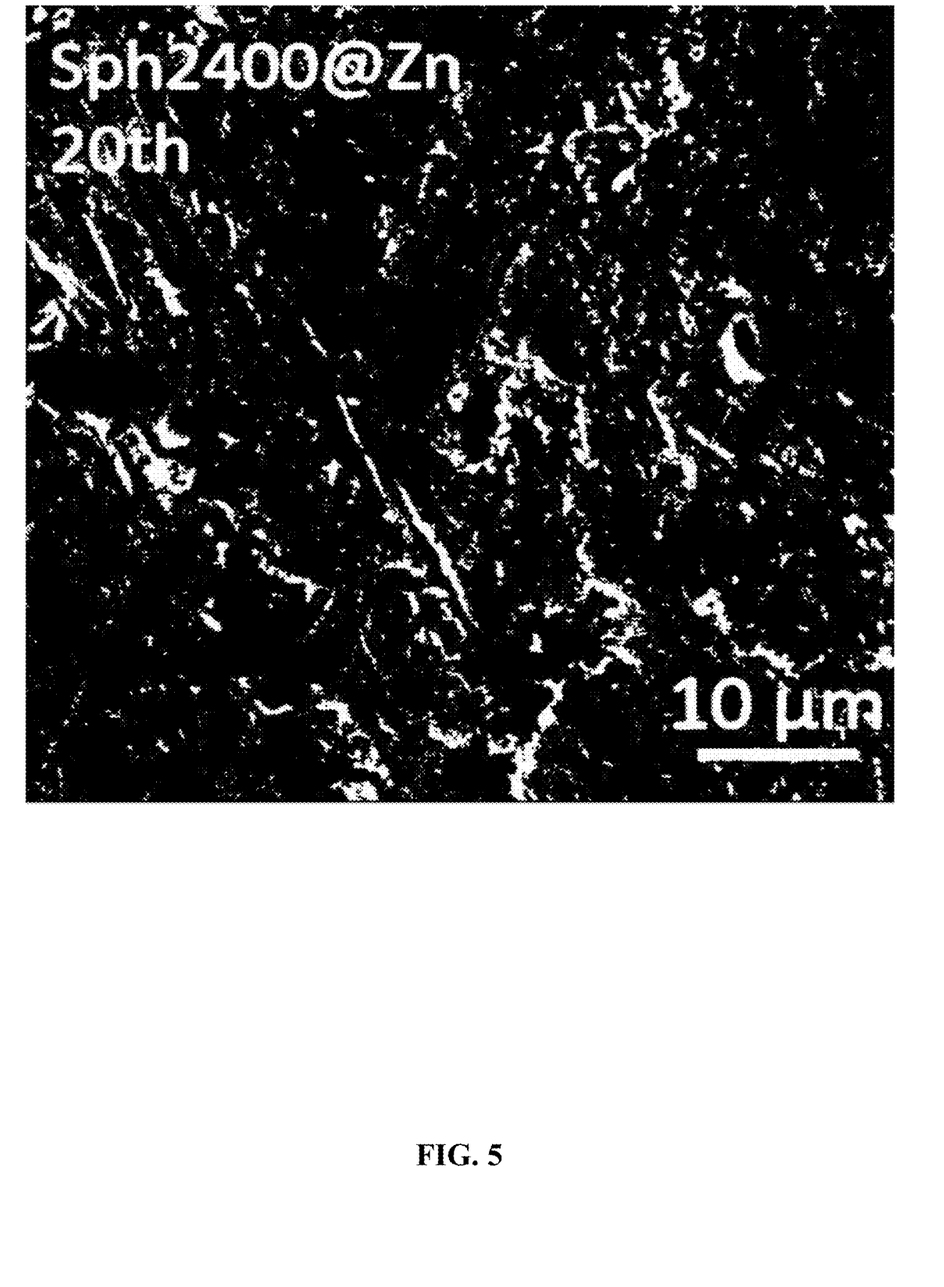
FIG. 5 is the scanning diagram of the zinc cathode surface after removing the coating after 20 cycles (40 hours) of the symmetrical battery composed of composite zinc metal cathode (Sph2400-DM@Zn) containing natural zinc blende multifunctional interface layer in Ratio 2 of the invention at a current density of 0.25 mA/cm2 and a surface capacity of 0.25 mAh/cm2.

Assembled Sph2400-DM@Zn//Sph2400-DM@Zn symmetrical battery is cycled at a current density of 0.25 mA/cm2 and a surface capacity of 0.25 mAh/cm2, after 20 cycles (corresponding to 40 hours), the battery is disassembled, and then the surface interface layer is removed, the surface photo of the zinc metal cathode is shown in FIG. 5.

Ratio 3

Figure 6:
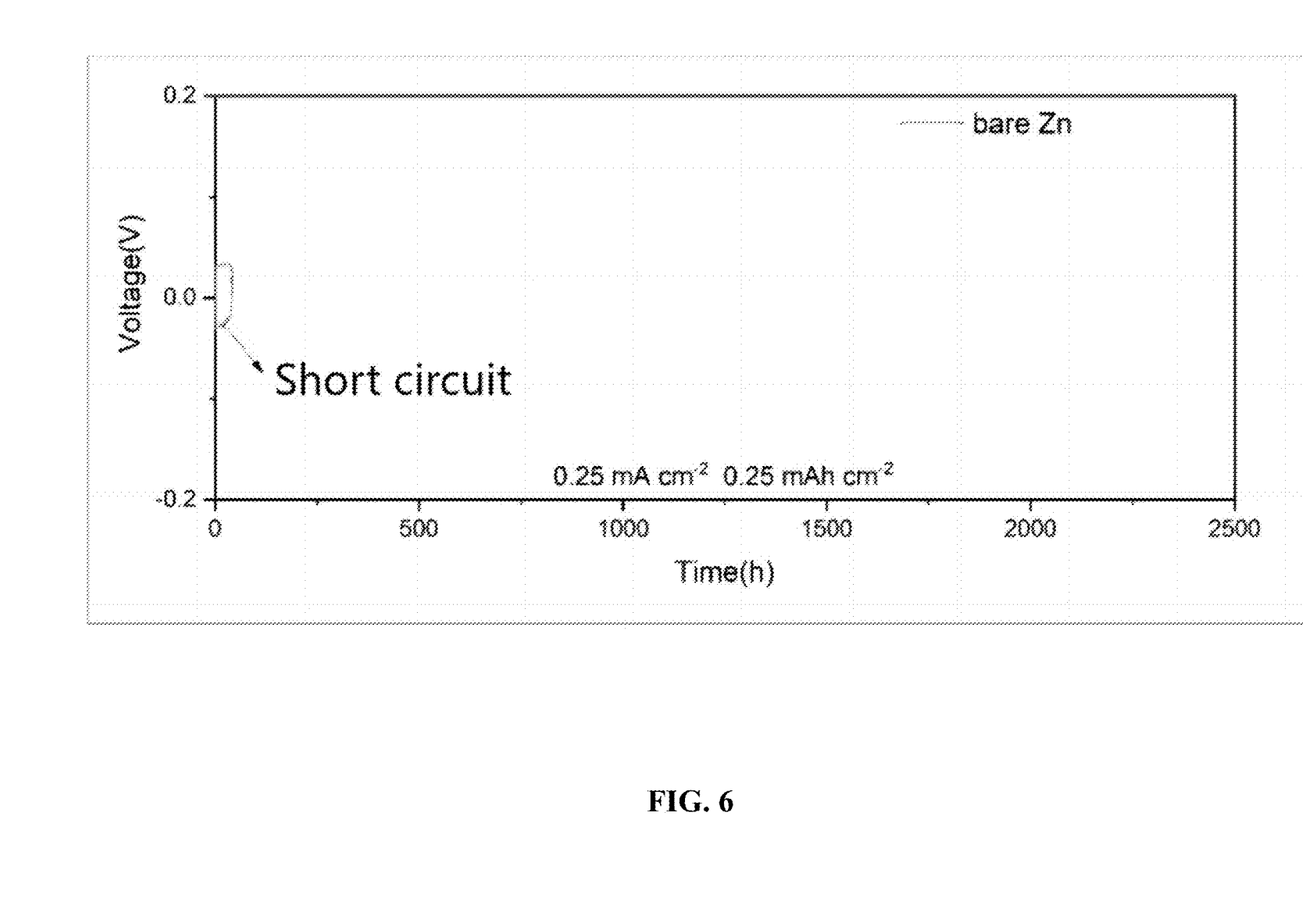
FIG. 6 is the cycle performance diagram of the bare zinc symmetrical battery in Ratio 3 of the invention under the condition of current density of 0.25 mA/cm2 and surface capacity of 0.25 mAh/cm2.

The Bare-Zn//Bare-Zn symmetrical battery is assembled by using bare zinc foil (Bare-Zn) as the electrolyte and 2 mol/L ZnSO4 solution as the electrolyte, the assembled Bare-Zn//Bare-Zn symmetrical battery is subjected to long cycles at a current density of 0.25 mA/cm2 and a surface capacity of 0.25 mAh/cm2, the performance is shown in FIG. 6.

Figure 7:
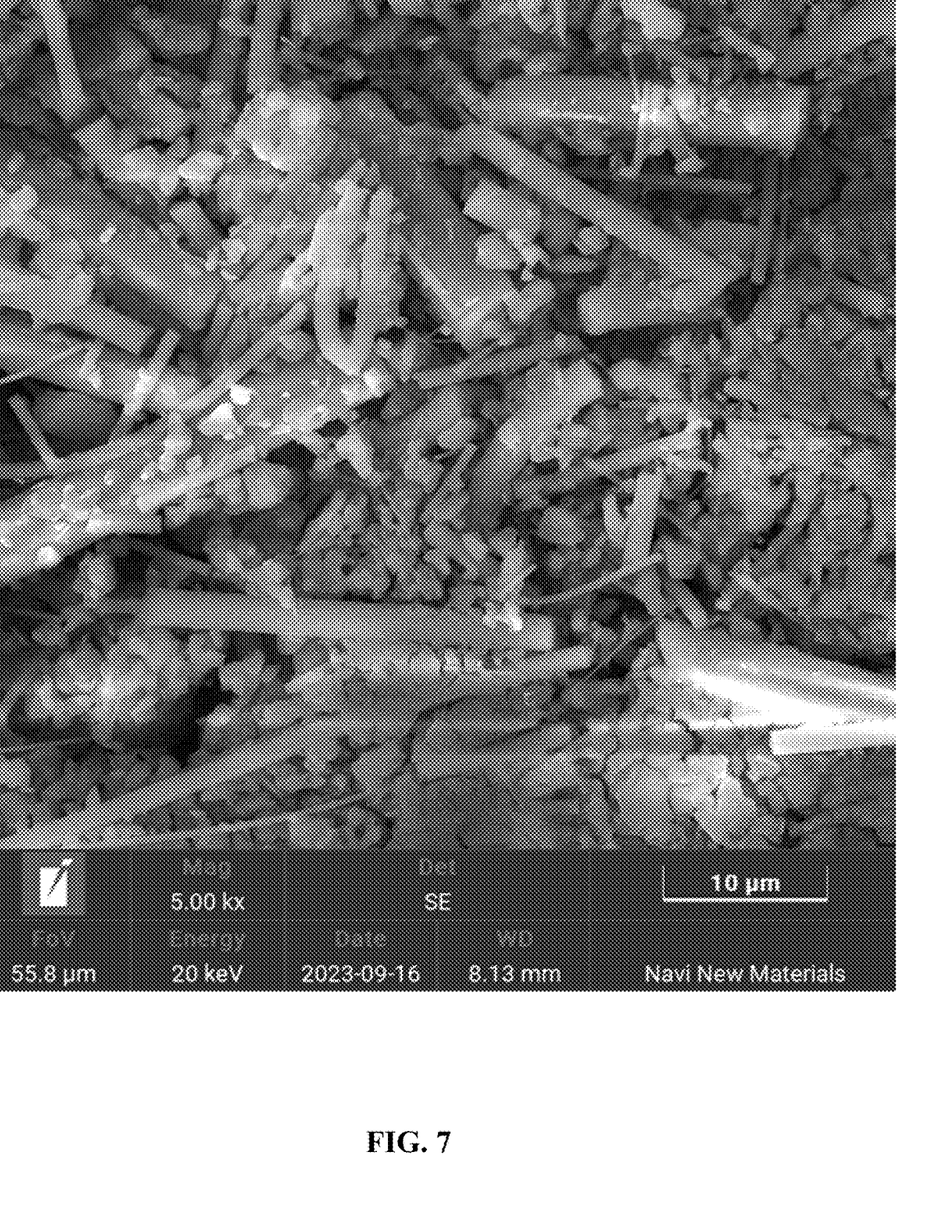
FIG. 7 is the scanning diagram of the zinc cathode surface after 20 cycles of the bare zinc symmetrical battery in Ratio 3 of the invention under the condition of current density of 0.25 mA/cm2 and surface capacity of 0.25 mAh/cm2.

The assembled Bare-Zn//Bare-Zn symmetrical battery is cycled at a current density of 0.25 mA/cm2 and a surface capacity of 0.25 mAh/cm2, after 20 cycles (corresponding to 40 hours), the battery is disassembled, the surface photo of the zinc metal cathode is shown in FIG. 7.

Ratio 4

Figure 9:
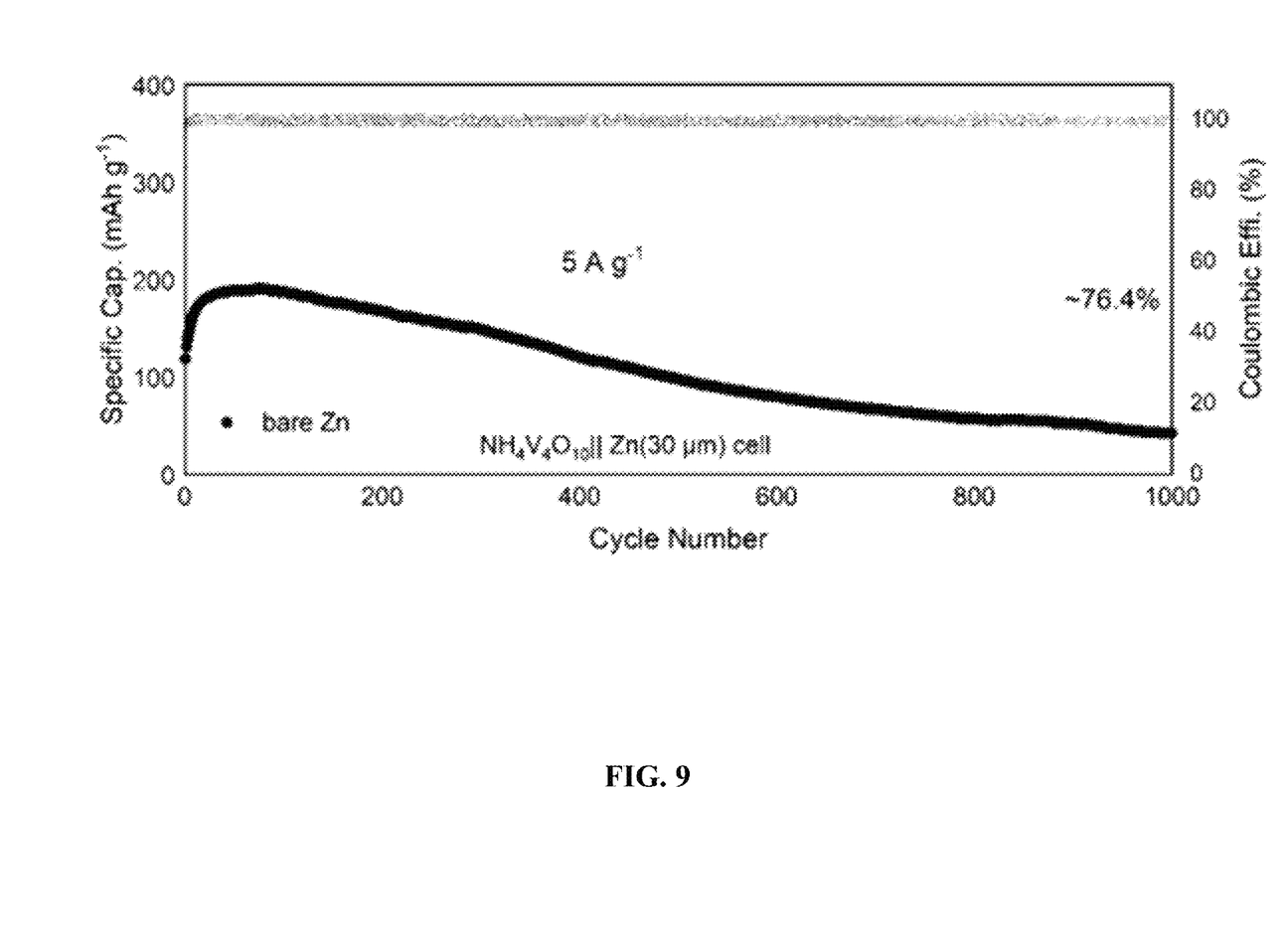
FIG. 9 is the cycle performance diagram of the zinc ion battery composed of thin bare zinc metal cathode (30 μm) and ammonium vanadate (NH4V4O10) anode in Ratio 4 of the invention under 5 A g-1 test condition.

The bare thin zinc cathode is used to match the ammonium vanadate (NH4V4O10) anode, and the electrolyte is 2 mol/L ZnSO4 solution, the assembled Zn//NH4V4O10 zinc ion battery is conducting the long cycle test under the 5 A g-1 test condition, the test results are shown in FIG. 9.

From FIG. 2, FIG. 4 and FIG. 6, it can be seen that under the same measurement conditions, compared with the bare zinc symmetrical battery, the short circuit occurs only after more than 20 h of cycles (FIG. 6); in contrast, the life of zinc metal symmetrical battery (Sph2400-DM@Zn//Sph2400-Zn) based on natural zinc blende functional interface layer is 510 h (FIG. 4), which is more than 25 times of the life of bare zinc battery; the life of the assembled Sph2400-DM@Zn//Sph2400-DM@Zn symmetrical battery based on the multifunctional interface layer zinc metal cathode of the natural zinc blende exceeds 2500 h, which is 100 times that of the bare zinc symmetrical battery (FIG. 2).

From the observation of the electrode sheet after the cycle in FIG. 3, FIG. 5 and FIG. 7, it can be seen that the surface of the zinc cathode of the bare zinc symmetrical battery is disordered, which are all by-products, dendrites and glass fibers (FIG. 7); the surface of the zinc cathode protected by the natural zinc blende functional interface layer (Sph2400) is relatively uniform, with only some cavities and no obvious by-products and dendrites (FIG. 5); the zinc metal cathode surface of the natural zinc blende multifunctional interface layer prepared by the invention is relatively uniform and very smooth, and no by-products and dendrites are observed (FIG. 3).

From FIG. 8 and FIG. 9, it can be seen that the capacity retention rate of Sph2400-DM@Zn//NH4V4O10 zinc ion battery after 1000 cycles is still 76.4% (FIG. 8); in contrast, the capacity retention rate of bare zinc battery without protective layer is only 28.0% after 1000 cycles. This shows that the natural zinc blende multifunctional interface layer can effectively stabilize the zinc cathode and prolong the life of the zinc ion battery.

Therefore, the invention provides a preparation method and application of multifunctional interface layer modified composite zinc cathode based on zinc blende, the surface of the zinc cathode is coated with multifunctional interface layer of natural zinc blende. After the battery is charged and discharged, zinc can be uniformly electroplated and peeled under the coating, which avoids the short circuit of the battery caused by piercing the diaphragm and improves the coulomb efficiency and cycle performance. The multifunctional artificial interface layer can simultaneously play the role of the artificial interface layer and the electrolyte additive. On the one hand, it can isolate the direct contact between the electrolyte and the zinc cathode and homogenize the zinc ion flow at the interface, on the other hand, the zwitterionic surfactant adsorbed on the surface of the ore can achieve the purpose of inhibiting dendrite and reducing corrosion by adjusting the zinc ion transport behavior at the interface or optimizing the zinc ion solvation structure, thereby prolonging the service life of the battery.

Finally, it should be noted that the above embodiments are only used to illustrate the technical schemes of the invention and are not intended to limit the technical schemes of the invention, although the invention has been described in detail with reference to the better embodiments, the ordinary technicians in this field should understand that it is still possible to make modifications or equivalent substitutions of the technical schemes of the invention, and such modifications or equivalent substitutions do not cause the modified technical schemes to be out of the spirit and scope of the technical schemes of the invention.

What is claimed is:

1. A preparation method of a multifunctional interface layer modified composite zinc cathode based on zinc blende, comprising the following steps:
   S1, conducting ball milling on zinc blende after crushing it to obtain a zinc blende powder;
   S2, mixing the zinc blende powder with a solvent, conducting wet screening through a sieve, collecting and drying it to obtain a wet-screened zinc blende powder;
   S3, adding the above wet-screened zinc blende powder into a certain concentration of zwitterionic surfactant solution and stirring it for a period, after suction filtration and drying, a graft modified wet-screened zinc blende powder is obtained;
   S4, mixing the above-mentioned graft modified wet-screened zinc blende powder with a binder in a certain proportion, and then adding an organic solvent into it to make a slurry; and
   S5, uniformly coating the above slurry on a surface of a zinc metal cathode, and then conducting a drying treatment to obtain a composite zinc cathode modified by the multifunctional interface layer, wherein a zwitterionic surfactant used in the zwitterionic surfactant solution of S3 is a betaine surfactant.

2. The preparation method of the multifunctional interface layer modified composite zinc cathode based on zinc blende according to claim 1, the ball milling in S1 comprises a first ball milling and a second planetary ball milling, in which the first ball milling has a speed of 100-300 r/min, for a time of 1-6 h; and the second planetary ball milling has a speed of 800-1200 r/min, and for a time of 6-14 h.

3. The preparation method of the multifunctional interface layer modified composite zinc cathode based on zinc blende according to claim 1, in S2 the solvent used is anhydrous ethanol or water, a mesh of the sieve used is 1800-2800 mesh, a drying device used to perform the drying is a vacuum drying box or a ventilated drying box, a drying temperature is 40-100° C., and a drying time is 6-24 h.

4. The preparation method of the multifunctional interface layer modified composite zinc cathode based on zinc blende according to claim 1, in S3, the period is >2 h, and a drying temperature is 40-100° C.

5. The preparation method of the multifunctional interface layer modified composite zinc cathode based on zinc blende according to claim 4, wherein the zwitterionic surfactant is the betaine surfactant which is 2-(methacryloyloxy) ethyl dimethyl-(3-sulfopropyl) ammonium hydroxide betaine.

6. The preparation method of the multifunctional interface layer modified composite zinc cathode based on zinc blende according to claim 1, in S4 the binder used is polyvinylidene fluoride, and the organic solvent used is N-methyl-2-pyrrolidone.

7. The preparation method of the multifunctional interface layer modified composite zinc cathode based on zinc blende according to claim 1, in S5, a coating method is one of scraping coating, spin coating or drop coating; a drying device used to perform the drying treatment is a vacuum drying oven or a ventilated drying oven, a drying temperature is 40-100° C. and a drying time is 6-24 h.

8. The composite zinc cathode prepared by the above preparation method of the multifunctional interface layer modified composite zinc cathode based on zinc blende according to claim 1.

9. An application of the above composite zinc cathode in an aqueous zinc metal battery according to claim 8.

10. The multifunctional interface layer of the composite zinc cathode surface according to claim 8.

11. The composite zinc cathode prepared by the above preparation method of the multifunctional interface layer modified composite zinc cathode based on zinc blende according to claim 2.

12. The composite zinc cathode prepared by the above preparation method of the multifunctional interface layer modified composite zinc cathode based on zinc blende according to claim 3.

13. The composite zinc cathode prepared by the above preparation method of the multifunctional interface layer modified composite zinc cathode based on zinc blende according to claim 4.

14. The composite zinc cathode prepared by the above preparation method of the multifunctional interface layer modified composite zinc cathode based on zinc blende according to claim 5.

15. The composite zinc cathode prepared by the above preparation method of the multifunctional interface layer modified composite zinc cathode based on zinc blende according to claim 6.

16. The composite zinc cathode prepared by the above preparation method of the multifunctional interface layer modified composite zinc cathode based on zinc blende according to claim 7.

* * * * *